United States Patent Office 2,901,683
Patented Aug. 25, 1959

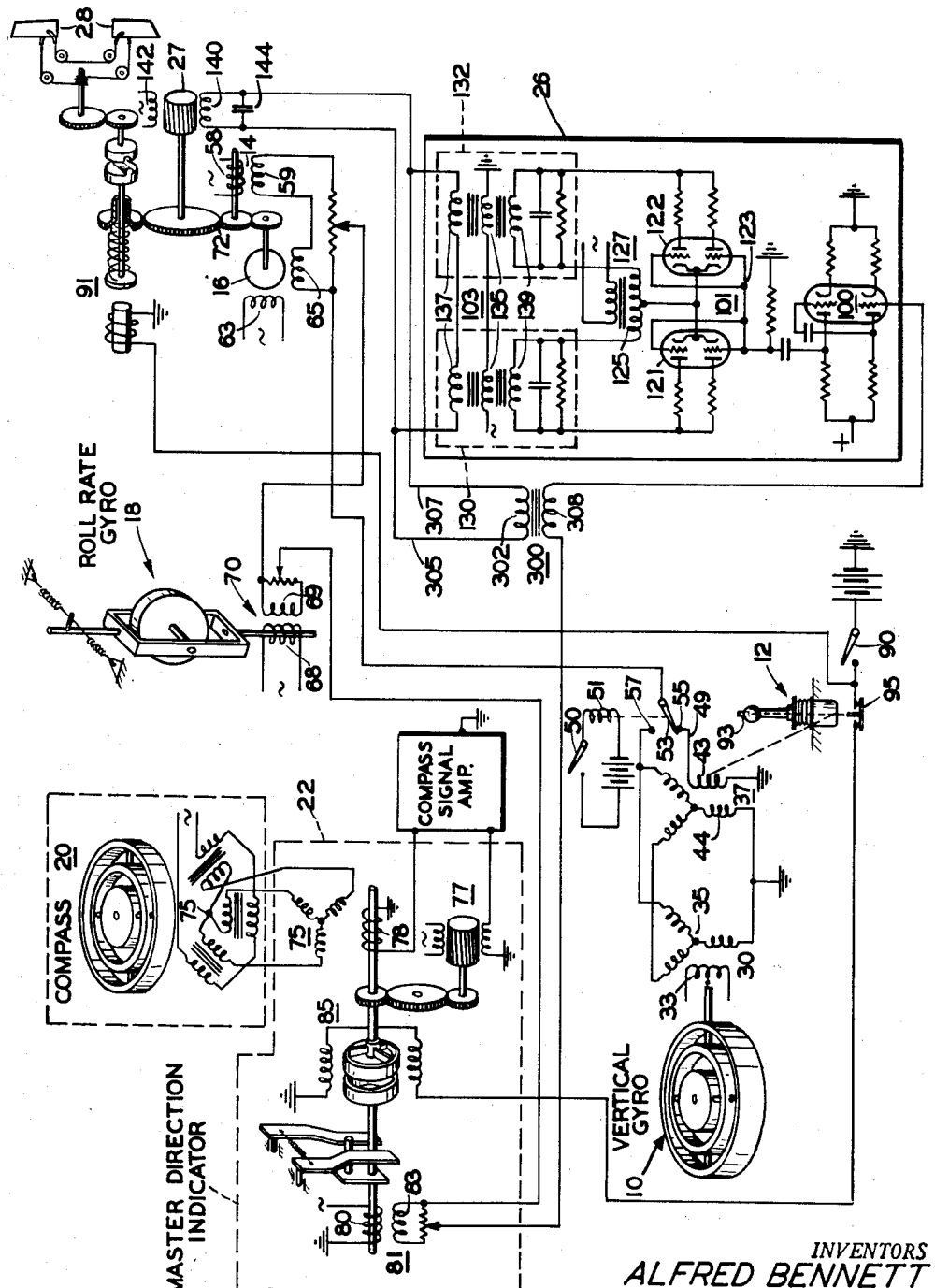

2,901,683

DAMPING ARRANGEMENT FOR AUTOPILOT SERVOSYSTEMS

Alfred Bennett, New York, N.Y., and Raymond I. Meyers, Hasbrouck Heights, N.J., assignors to Bendix Aviation Corporation, Teterboro, N.J., a corporation of Delaware Application April 24, 1953, Serial No. 350,830

5 Claims. (Cl. 318—489)

This invention relates generally to control systems and more particularly to the damping of automatic control systems.

While oscillation or hunting is a problem in all servosystems, it is a particularly serious problem in automatic pilot systems for high speed aircraft where servomotors must move large control surfaces rapidly to maintain the craft in a stable attitude yet be capable of stopping the movement of the control surface without overrunning the ordered position, the overrunning tendency being great because of the kinetic energy stored in the inertia of moving parts. When any overrunning occurs, the motor must reverse and drive the surface in an opposite direction. This results in oscillation.

Preventing oscillation in automatic pilot systems is complicated by the fact that the weight of the automatic pilot system must be kept at a minimum and that motion transmission means such as linkages, gearing or other booster systems may be interposed between the motor and the control surfaces. Since a lapse of time due to these transmissions may occur between the ordering of a position and the movement of the surface to this position, the change in attitude of the craft during this lag period may also result in oscillation.

An object of the invention, therefore, is to provide a novel anti-hunting means for control systems.

Another object of the invention is to provide a novel apparatus for developing a damping signal for an automatic pilot system in which the signal is proportional to the control effect for the servomotor of the system.

The present invention contemplates the utilization of the lag inherent in magnetic amplifiers for developing a signal difference between the input to the amplifier and its output for damping the operation of a servomotor.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

The single figure on the single sheet of drawing shows a complete schematic wiring diagram for the novel damping arrangement of the present invention in operative association with the roll channel of an automatic pilot system.

An automatic pilot system for an aircraft generally controls the craft about its pitch, roll, and yaw axes. Only the roll control channel of the automatic pilot system is illustrated herein for purposes of simplicity. It is obvious, however, that the novel damping arrangement may be used with other channels as well. The automatic pilot system herein may be generally of the type described in U.S. Patent No. 2,625,348 issued January 13, 1953, to Noxon et al.

The reference instruments for the roll control channel of the embodiment herein of the automatic pilot system are a vertical gyro 10, a manual controller 12, a follow-up device 14, a rate generator 16, a roll rate gyro 18, and an earth inductor compass 20 with a master direction indicator 22. Since the signals from these instruments are usually of a low voltage level, they are amplified by an amplifier 26 before being applied to a servomotor 27.

Vertical gyro 10 may be of a conventional type. An inductive signal generating device 30 as a transmitter on the roll axis of gyro 10 develops signals corresponding to the attitude of the aircraft with respect to a predetermined attitude. Although rotor winding 33 of transmitter 30 is energized by a suitable source of alternating current, the output of stator 35 is null when the craft is not banked. Upon a banking of the craft, relative movement between rotor 33 and stator 35 occurs, developing a signal whose phase and amplitude depend, respectively, upon the direction which the craft banks from a zero bank condition and the extent of the bank angle. Thus, transmitter 30 provides a signal output in accordance with the angle of bank of the craft.

The bank attitude signal is applied to an inductive receiver device 37 in manual controller 12 which may be of the type described in U.S. Patent No. 2,614,776 issued October 21, 1952, to F. H. S. Rossire. As the stick of the controller is moved, rotor 43 is displaced relative to stator 44; stators 35 and 44 being relatively fixed with respect to the craft. The error in position between rotors 33 and 43 develops in rotor 43 a signal which corresponds in phase and amplitude to direction and extent of movement. This signal applied to servomotor 27 displaces aileron 28 to bank the craft. As the craft assumes a bank condition, rotor 33 is moved relative to stator 35. Accordingly, the error signal is cancelled when the craft reaches the bank attitude called for by manual controller 12.

Manual controller 12 can be rendered ineffective to control the craft during an emergency, and the attitude signals from transmitter 30 on vertical gyro 10 will return the craft to a level flight condition. To this end, the moving of a switch 50 to a closed circuit position energizes a relay 51. This moves armature 53 from its position as shown in the drawings in engagement with a contact 55 where the controller is effective to a position in engagement with a contact 57 where the controller is rendered ineffective.

As servomotor 27 displaces surface 28, it also operates follow-up device 14. This is an inductive signal developing device whose rotor 58 is moved relative to stator 59 by operation of motor 27 to develop signals corresponding in amplitude to the extent of displacement of ailerons 28 from their normal streamlined position. The follow up signal is in opposition to the reference signal ordering the surface displacement. Therefore, the extent of the displacement of the ailerons will correspond to the amplitude of the reference signal.

Servomotor 27 also actuates rate generator 16 which develops signals corresponding to the rate of operation of servomotor 27. These signals tend to keep the servomotor from overrunning the position commanded by the reference signal. This rate generator may be a conventional type in which one winding 63 is energized by an alternating current and a signal is induced in its other winding 65 when the rotor of the generator is moved. This signal corresponds in amplitude to the rate of operation of the servomotor.

The craft in moving about its axis to make a correction develops a certain angular velocity which would tend to cause the craft to drift past the assigned position. A conventional roll rate gyro 18 responds to this velocity and develops a corresponding signal by displacing a rotor 68 of an inductive device 70 relative to its stator 69.

The directional or azimuth reference may be provided by an earth inductor compass 20 which may be of conventional type. The directional signal induced by the earth's magnetic field in pick-up element 72 is reproduced in receiver 75 of master direction indicator 22. As a motor 77 moves rotor 78 of the receiver to maintain the rotor in a null position with respect to receiver 75, it will position rotor 80 of an inductive device 81 relative to its stator 83 when a magnetic clutch 85 is engaged. This is engaged when a switch 90 is moved to a closed circuit position to energize a solenoid actuated clutch 91 to engage servomotor 27 with the aileron surfaces 28. The output of inductive device 81 is null as long as the craft is flying on the desired course. Upon a departure of the craft from this course, inductive device 81 develops a signal whose phase and amplitude depend, respectively, upon the direction and extent of departure. The signal from inductive device 81 then corresponds to the departure of the craft from a predetermined heading.

The heading signal is disconnected when the manual controller 12 is moved, it being necessary to depress button 93 to move the controller thereby opening switch 95. Thus the heading signal will not oppose the manual turning.

The foregoing signals are connected in series to a servoamplifier 26 where they are amplified to operate motor 27. This servoamplifier is comprised generally of a preamplifier 100, a discriminator 101 and a magnetic amplifier 103. The signal combination from the reference devices is impressed upon preamplifier 100 which may be a conventional twin triode tube. After two stages of amplification, the signal is applied across a blocking condenser to a common lead connecting the two twin triodes 121 and 122.

Triodes 121 and 122 constitute a discriminator 101 for detecting the phase of the signal and developing a corresponding direct current output. In this discriminator, the plates and grids of each tube are paralleled for greater power. The signals on each grid are of the same phase because a lead 123 ties the grids together. The phases of the excitation for the plates of each tube, however, are in opposition since such excitation is supplied from the opposite ends of a center tapped secondary winding 125 of a transformer 127. Therefore, only one tube will conduct to develop an output at an instant because only one tube will have its plates in phase with the signal on its grids. This output is applied to magnetic amplifier 103.

Magnetic amplifier 103 is composed of two saturable reactors 130 and 132. Each reactor has three windings, wound on a magnetically permeable core: a primary winding 135, a secondary winding 137, and a control winding 139. The primary windings are connected in series aiding and are energized by a source of alternating current. The secondary windings are connected in series opposition and form a closed circuit with the variable field winding 140 of servomotor 27. Each control winding is connected to form a closed circuit with the plates of one tube of discriminator 101.

The phase of the input signal to the servoamplifier controls the output of the discriminators which in turn controls the output of the magnetic amplifier. When no signal is applied to discriminator 101, the two voltages induced in secondary windings 137 of magnetic amplifier 103 are equal. These secondary windings are connected in series opposition, however, so the equal voltages are in phase opposition. They cancel each other and the net value of the voltages is zero. Therefore, no current flows from the magnetic amplifier. When one of the discriminator tubes conducts, the magnetic core of the reactor to which it is connected tends to become more saturated with direct current flux. While the induction in the secondary winding of this reactor is reduced correspondingly, the other reactor is not affected. With the induction in the secondary winding of one reactor reduced, the opposing voltage will prevail resulting in an alternating current flow through the circuit of the variable phase winding 140 of the servomotor 27.

Servomotor 27 is an induction motor having, in addition to the variable phase winding 140, a fixed phase winding 142 which is continuously energized by a source of alternating current. A capacitor 144 across the variable phase winding maintains the quadrature relationship between the two field windings that is necessary for maximum motor efficiency. The direction of rotation of the motor is determined by the lead or lag of the variable phase field with respect to the fixed phase field. This lead or lag, in turn, depends upon which control winding of the magnetic amplifier is energized, and this is determined by the phase of the signal applied to the servoamplifier. Thus, the phase of the reference signal at preamplifier 100 determines the direction of rotation of servomotor 27.

The displacement of the craft in roll results in a corresponding relative displacement between rotor 33 and stator 35 on the vertical gyro 10. The amplitude of the resulting attitude signal is proportional to the angle of the bank, and its phase is determined by the direction of the banking, i.e., of one phase for a right bank and one hundred eighty degrees out of phase for a left bank. This signal reaches the grid of preamplifier 100 unaffected when the other generators are in their null positions.

The attitude signal is given two stages of amplification in amplifier 100 and applied to the grids of the two tubes of discriminator 101. Depending upon the phase of the signal, one control winding 139 of the magnetic amplifier 103 is energized. Depending upon which control winding is energized, the alternating current fed to the variable phase winding 140 of the servomotor 27 will cause the servomotor to rotate in a clockwise or counterclockwise direction.

As the servomotor displaces the ailerons through a suitable gear train and cabling, it also displaces the rotor 58 of follow-up device 14 relative to its stator 59 and a follow-up signal develops in the stator. This signal is in phase opposition to the bank displacement signal. As the aileron displacement continues, the follow-up signal increases in amplitude until the follow-up signal is equal and opposite to the bank displacement signal. At this time, the signals cancel each other; the net input to the servoamplifier is zero; the servomotor stops; and the displacement of the ailerons is the proper amount in a proper direction to correct for the bank of the craft.

The rate generator 16 is also actuated by the servomotor and develops a signal proportional to the rate of rotation of the servomotor. This signal is in opposition to the reference signal and tends to stop the motor from overrunning the equilibrium position where the follow-up signal balances the displacement signal.

At the time the servomotor stops, the craft may have some inertia due to its movement that would tend to cause it to drift past the desired altitude. Roll rate gyro 18 responds to the rate of turning of the craft about its roll axis and develops a signal which tends to stop the craft from overrunning the desired attitude.

While the foregoing automatic pilot system operates well, the problem of oscillation may still exist because of lags such as those due to motion transmission device and booster systems. The novel arrangement of the present invention provides the required damping action under these conditions.

In accordance with the present invention, damping for the system is provided by degeneratively feeding back a portion of the alternating current signal from the output of the servoamplifier to the signal chain of the servoamplifier. This signal tends to cause the output signal to become null or zero, and in the embodiment herein, is inserted into the signal chain by way of a coupling transformer 300.

Coupling transformer 300 has a primary winding 302 connected by leads 305 and 307 across the output of magnetic amplifier 103 and has a secondary winding 308 connected in series with the reference devices and the servoamplifier. The connection of secondary winding 308 into the signal chain is such that the alternating signal developed in the secondary winding by the output of magnetic amplifier is in phase opposition to the alternating current reference signal causing this output.

As is well known, a slight period of time exists between the application of a control signal to a magnetic amplifier and the development of a corresponding output in response, this sluggish response being inherent in any circuit containing reactance. Accordingly, a lapse of time occurs between the appearance of a signal at the grid of preamplifier 100 and the development of a corresponding signal at the output of magnetic amplifier 103 because of the reactance involved in the magnetic amplifier. Up to the limit value which is reached when one core of the magnetic amplifier is saturated with direct current flux from the control winding, the value of the amplitude of the alternating current output from the magnetic amplifier is proportional to the magnitude of the input signal to preamplifier 100. Feeding back a portion of this signal degeneratively by way of coupling transformer 300 to the input of the amplifier develops a signal at the input corresponding to the difference between the present input and the input signal of a delayed interval before. This gives a dynamic braking action.

The feedback signal does not appreciably affect the starting of the motor since it is delayed in passing through the amplifier. The feedback signal, therefore, has an amplitude that is small with respect to the amplitude of the reference signal when the reference signal is rising in amplitude. However, as the reference signal decreases, the motor because of the inertia stored as kinetic energy in the moving parts tends to continue rotating. The feedback signal now becomes effective. As before, the amplitude of the feedback signal corresponds to the amplitude of the reference signal of a previous interval of time. Thus, the amplitude of the feedback signal is large with respect to the amplitude of the reference signal and, acting in opposition to the reference signal, operates as a dynamic brake. The amplitude of the feedback signal is made small with respect to the normal operating range of input signals from the sensors so that it becomes particularly effective as the reference signal drops toward zero.

The foregoing has presented a novel damping arrangement that is light in weight and easily adapted to existing automatic pilot systems. The damping is particularly effective as the command signal drops to zero when the damping of the servomotor is needed most.

Although but a single embodiment of the invention has been illustrated and described for controlling a craft about one axis thereof, it is to be expressly understood that the invention is not limited thereto. Various changes may also be made in the design and arrangement of the parts without departing from the scope of the invention as will now be understood by those skilled in the art.

We claim:

1. In an automatic steering system for an aircraft having a control surface thereon, a servomotor operatively connected with said surface for moving the latter, reference means for developing a signal corresponding to deviation of the craft from a predetermined reference, means connecting said reference means and said servomotor for operating the latter from said signal including means for amplifying said signal, said amplifying means having saturable reactor delay means therein for delaying said signal, and means for feeding a portion of the output of said amplifying means back to said reference means in opposition to said reference signal whereby said servomotor is operated by a combination of said reference signal and said feedback portion.

2. In an automatic steering system for an aircraft having a control surface thereon, a servomotor operatively connected with said surface for moving the latter, reference means for developing a signal corresponding in phase and amplitude to the direction and extent of deviation of the craft from a predetermined reference, means connecting said reference means and said servomotor for operating the latter from said signal including means for detecting the phase of the signal and developing a corresponding output, normally balanced saturable reactor means responsive to said output for developing a delayed amplified signal corresponding to said output when unbalanced thereby, and means operatively connected between said last named means and said motor and with said reference means for feeding a portion of said delayed amplified signal back to said reference means in opposition to said reference signal whereby said servomotor is operated by a combination of said reference signal and said feedback portion.

3. A servosystem comprising a servomotor, a source of reference signals, means operatively connecting said source and said servomotor including saturable reactor means for amplifying said signal, said signal being delayed in said reactor means, means operably connected to said last named means and said source for feeding a portion of said delayed amplifier signal back to said source in opposition to said reference signal, means operatively connected with said motor and operable thereby for developing a signal corresponding to the rate of operation of said motor, and means for feeding the latter back in opposition to said input signal, whereby said servomotor is operated by a combination of said signals.

4. A servosystem comprising a servomotor, a source of reference signals of reversible phase and varying amplitude, a phase sensitive means operatively connected to said source for detecting the phase of said signal and developing a corresponding direct current, saturable reactor means including a pair of magnetically permeable core members, each core member having thereon a supply winding adapted to be energized by an alternating current, an output winding adapted to have a delayed alternating current induced therein by said supply winding, and a control winding for controlling the delayed induction coupling of said supply and output windings, said supply windings of both members being connected in series aiding relation, said secondary windings of both members being connected in series opposition and being connected to said motor whereby the secondary winding is normally balanced and no output signal is transmitted to said motor, said control windings being connected to said phase sensitive means whereby in response to current flow in one of said control windings said secondary windings are unbalanced providing a delayed output signal to operate said motor, and means operatively connecting said source and said output winding for feeding a portion of said delayed output signal for said motor back to said source in opposition to said reference signal.

5. An amplifier having a preamplifier portion at its input adapted to receive a signal corresponding to a condition and a magnetic amplifier at its output for providing a delayed amplified output voltage corresponding to the signal, and means connecting the output to the input for feeding a voltage proportional to the output voltage to the input.

References Cited in the file of this patent

UNITED STATES PATENTS

| | | |
|---|---|---|
| 2,592,173 | Noxon | Apr. 8, 1952 |
| 2,625,348 | Noxon | Jan. 13, 1953 |
| 2,644,124 | Broadbent | June 30, 1953 |
| 2,692,256 | Milsom | Oct. 19, 1954 |